(12) United States Patent
Zimmerman et al.

(10) Patent No.: US 11,286,648 B2
(45) Date of Patent: Mar. 29, 2022

(54) SYSTEM AND METHOD FOR ESTIMATING IMPLEMENT LOAD WEIGHTS DURING AUTOMATED BOOM MOVEMENT

(71) Applicant: CNH Industrial America LLC, New Holland, PA (US)

(72) Inventors: Joshua D. Zimmerman, Willow Springs, IL (US); Raul Espinosa, Pittsburg, PA (US); Navneet Gulati, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 398 days.

(21) Appl. No.: 16/396,000

(22) Filed: Apr. 26, 2019

(65) Prior Publication Data

US 2020/0340213 A1     Oct. 29, 2020

(51) Int. Cl.
*E02F 9/26* (2006.01)
*G01G 19/12* (2006.01)

(52) U.S. Cl.
CPC .............. *E02F 9/26* (2013.01); *G01G 19/12* (2013.01)

(58) Field of Classification Search
CPC ........... E02F 3/434; E02F 9/2296; E02F 9/26; G01G 19/12
See application file for complete search history.

(56) References Cited

U.S. PATENT DOCUMENTS

| | | | |
|---|---|---|---|
| 6,275,757 B1* | 8/2001 | Watanabe | E02F 9/2203 701/50 |
| 6,518,519 B1* | 2/2003 | Crane, III | E02F 9/264 177/136 |
| 8,126,619 B2 | 2/2012 | Corder et al. | |
| 9,630,822 B2 | 4/2017 | Ellis et al. | |
| 9,938,692 B2* | 4/2018 | Shatters | E02F 9/26 |
| 10,053,838 B2 | 8/2018 | Kean et al. | |
| 11,009,522 B2* | 5/2021 | Currier | G01P 15/0802 |
| 2008/0005938 A1* | 1/2008 | Aebischer | E02F 9/26 37/413 |
| 2008/0169131 A1 | 7/2008 | Takeda et al. | |
| 2017/0131134 A1 | 5/2017 | Kang | |
| 2017/0167115 A1 | 6/2017 | Lee et al. | |
| 2020/0018037 A1* | 1/2020 | Nakamura | G01G 19/18 |
| 2020/0131737 A1* | 4/2020 | Suzuki | E02F 9/265 |
| 2020/0232189 A1* | 7/2020 | Yamanobe | E02F 9/26 |
| 2021/0040710 A1* | 2/2021 | Tanaka | E02F 9/20 |
| 2021/0079625 A1* | 3/2021 | Narikawa | E02F 3/435 |

* cited by examiner

*Primary Examiner* — Tyler J Lee
(74) *Attorney, Agent, or Firm* — Rickard K. DeMille; Rebecca L. Henkel (57) ABSTRACT

A method for estimating implement load weights includes controlling an operation of at least one component of the work vehicle to perform an automated boom movement operation during which a boom of a work vehicle is automatically moved across an angular range of boom positions from a starting position to a final position. The method also includes receiving load-related data associated with a load weight for an implement of the work vehicle as the boom is moved across the range of positions, and identifying at least one measurement region within the angular range of positions associated with a phase of the automated boom movement operation during which a boom velocity of the boom is maintained substantially constant. In addition, the method includes determining a region load weight the at least one measurement region based on the load-related data.

16 Claims, 6 Drawing Sheets

SYSTEM AND METHOD FOR ESTIMATING IMPLEMENT LOAD WEIGHTS DURING AUTOMATED BOOM MOVEMENT

FIELD OF THE INVENTION

The present subject matter relates generally to work vehicles and, more particularly, to a system and method for estimating the load weight carried by an implement of a work vehicle during automated movement of the vehicle's boom.

BACKGROUND OF THE INVENTION

Work vehicles having loader arms or booms, such as wheel loaders, skid steer loaders, and the like, are a mainstay of construction work and industry. For example, wheel loaders typically include a boom pivotally coupled to the vehicle's chassis that can be raised and lowered at the operator's command. The boom typically has an implement attached to its end, thereby allowing the implement to be moved relative to the ground as the boom is raised and lowered. For example, a bucket is often coupled to the boom, which allows the wheel loader to be used to carry supplies or particulate matter, such as gravel, sand, or dirt, around a worksite or to transfer such supplies or matter to an adjacent transport vehicle (e.g., a truck or railroad car).

When using a work vehicle to perform a material moving operation, it is often desirable to have an accurate estimate of the load weight being carried by the bucket or other implement. For instance, when transferring materials to a transport vehicle, load weight estimates may be used to determine how much material has been loaded onto the transport vehicle to ensure that its load capacity is not exceeded. In this regard, several systems have been developed that attempt to estimate the load weight being carried by within a bucket. However, to date, such systems lack the accuracy and/or reliability typically desired by operators of commercial work vehicles.

Accordingly, an improved system and method for estimating the load weight carried by an implement of a work vehicle would be welcomed in the technology. In particular, systems and methods for estimating implement load weight during the performance of an automated boom movement operation would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for estimating load weights for an implement of a work vehicle during automated boom movement. The method includes controlling, with the one or more computing devices, an operation of at least one component of the work vehicle to perform an automated boom movement operation during which a boom of the work vehicle is automatically moved across an angular range of boom positions from a starting position to a final position. The method also includes receiving, with the one or more computing devices, load-related data associated with a load weight for the implement as the boom is moved across the angular range of positions, and identifying, with the one or more computing devices, at least one measurement region within the angular range of boom positions associated with a phase of the automated boom movement operation during which a boom velocity of the boom is maintained substantially constant. In addition, the method includes determining, with the one or more computing devices, a region load weight the at least one measurement region based on the load-related data.

In another aspect, the present subject matter is directed to a system for estimating implement load weights for a work vehicle during automated boom movement. The system includes a lift assembly having a boom and an implement coupled to the boom and a controller configured to control the operation of the lift assembly. The controller includes a processor and associated memory. The memory stores instructions, that when implemented by the processor, configure the controller to receive an input associated with initiating an automated boom movement operation during which the boom is to be automatically moved across an angular range of boom positions from a starting position to a final position, and control an operation of at least one component of the work vehicle to automatically move the boom across the angular range of boom positions. The controller is also configured to receive load-related data associated with a load weight for the implement as the boom is moved across the angular range of boom positions, and identify at least one measurement region within the angular range of boom positions associated with a phase of the automated boom movement operation during which a boom velocity of the boom is maintained substantially constant. In addition, the controller is configured to determine a region load weight the at least one measurement region based on the load-related data.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for estimating a load weight carried by an implement of a work vehicle. In particular, systems and methods are disclosed that allow for the implement load weight to be estimated during automated boom movement. For example, a controller of the vehicle may be configured to automatically control the operation of the vehicle's hydraulic system to move the boom to an operator-selected position, such as a predefined position relative to the ground (e.g., a return-to-height position, a return-to-dump position, a return-to-travel position, a return-to-dig position, and/or the like). During such automated movement of the boom to the selected position, the boom may be rotated or pivoted through one or more load measurement regions. For instance, as will be described below, in several embodiments, a travel range of the boom may be divided into a plurality of load measurement regions. In such embodiments, as the boom is automatically moved across all or a portion of the measurement regions towards the operator-selected position, a region load weight (e.g., an average implement load weight) may be determined for each of such measurement regions. A final load weight for the implement may then be calculated based on the region load weight(s) for the applicable measurement region(s).

Additionally, in several embodiments, the load data used to calculate the final load weight may be selected based, at least in part, on the velocity profile for the boom during the performance of the automated boom movement operation. For example, the velocity profile during the automated boom movement operation may include three stages or phases: 1) an acceleration phase during which the boom velocity is increased (e.g., from zero) to a predetermined boom speed: 2) a constant speed phase during which the boom velocity is maintained at or substantially at the predetermined boom speed as the boom is moved towards the operator-selected position: and 3) a deceleration phase during which the boom velocity is decreased from the predetermined boom speed to zero as the boom reaches the operator-selected position. Given such a velocity profile, the load data collected during the acceleration and deceleration phases may, for example, be deemed unreliable due to the changing inertial loads as the boom velocity is being increased/decreased. As a result, in several embodiments, the controller may be adapted to only consider the load data collected during the constant speed phase of the automated boom movement. For instance, in one embodiment, the controller may be configured to simply discard or ignore the load data collected across the portions of the boom movement associated with the acceleration and deceleration phases. Alternatively, the controller may be configured to define the applicable load measurement range as only corresponding to the portion of the boom movement associated with the constant speed phase.

It should be appreciated that, as described herein, the "constant speed phase" of an automated boom movement operation generally corresponds to the phase during which the boom velocity is maintained substantially constant. In this regard, the boom velocity is considered as being maintained substantially constant along a given range of boom positions when the boom velocity across such range of boom positions varies by less than 10%, such as less than 5% or less than 2.5%, and/or any other subranges therebetween.

In addition to selecting the load data to be analyzed based on the boom velocity profile, the controller may also be configured to discard or ignore load data collected within the constant speed phase when significant variability is detected in the vehicle's operation and/or in the actual load weight calculations. For instance, operator-initiated control commands executed within the constant speed phase that are associated with vehicle accelerations, gear shifts, engine speed changes, and/or overriding the automated boom movement operation may result in inaccuracies in the load data being captured. Similarly, significant load variations occurring during automated boom movement may be indicative of, for example, material spilling from the bucket and, thus, the load data associated therewith may be discarded or ignored when calculating the final load weight for the implement.

Figure 1:
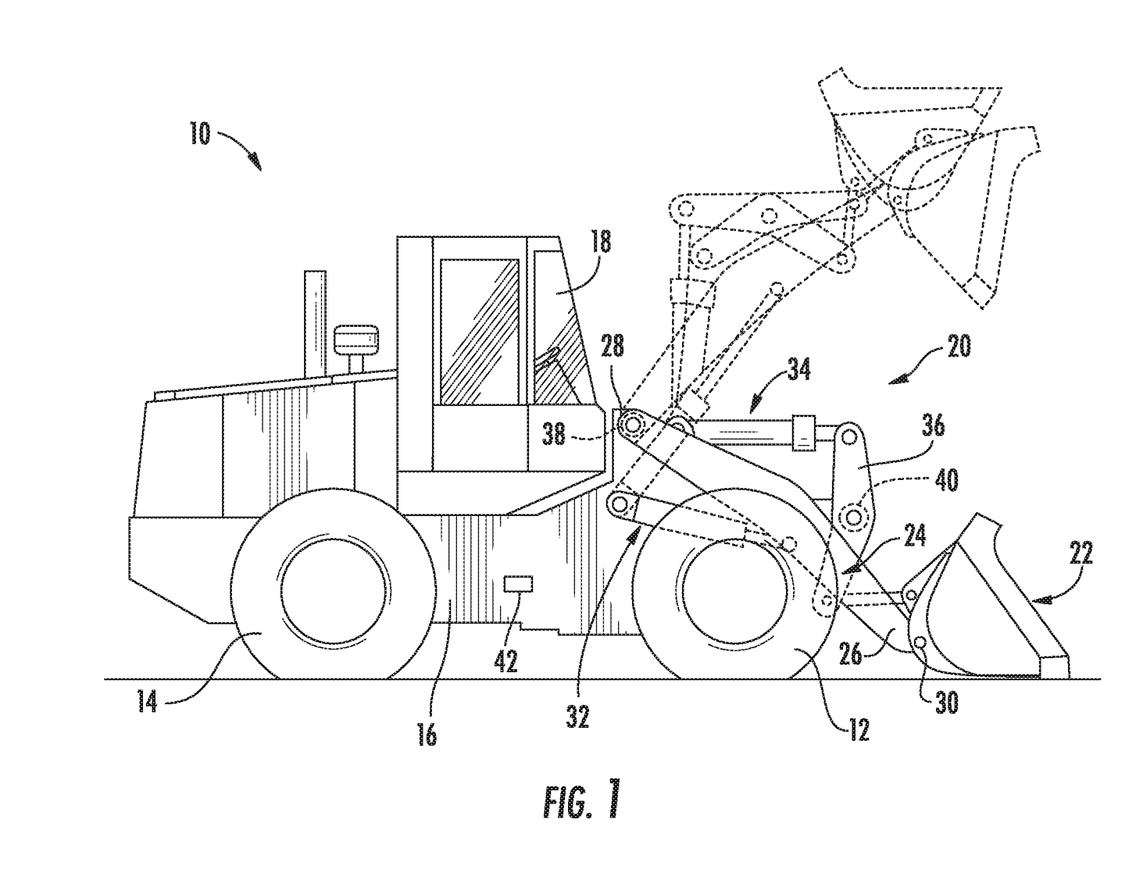
FIG. 1 illustrates a side view of one embodiment of a work vehicle in accordance with aspects of the present subject matter.

Referring now to the drawings, FIG. 1 illustrates a side view of one embodiment of a work vehicle 10 in accordance with aspects of the present subject matter. As shown, the work vehicle 10 is configured as a wheel loader. However, in other embodiments, the work vehicle 10 may be configured as any other suitable work vehicle that includes a lift assembly for adjusting the position of an associated implement, such as a skid steer loader, a backhoe loader, a compact track loader and/or the like.

As shown, the work vehicle 10 includes a pair of front wheels 12, (one of which is shown), a pair of rear wheels 14 (one of which is shown) and a frame or chassis 16 coupled to and supported by the wheels 12, 14. An operator's cab 18 may be supported by a portion of the chassis 16 and may house various input devices for permitting an operator to control the operation of the work vehicle 10.

Moreover, as shown in FIG. 1, the work vehicle 10 may include a lift assembly 20 for raising and lowering a suitable implement 22 (e.g., a bucket) relative to a driving surface of the vehicle 10. In several embodiments, the lift assembly 20 may include a boom 24 (e.g., including one or more loader or boom arms) pivotally coupled between the chassis 16 and the implement 22. For example, as shown in FIG. 1, the boom 24 may include a forward end 26 and an aft end 28, with the forward end 26 being pivotally coupled to the implement 22 at a forward pivot point 30 and the aft end 28 being pivotally coupled to a portion of the chassis 16.

Figure 2:
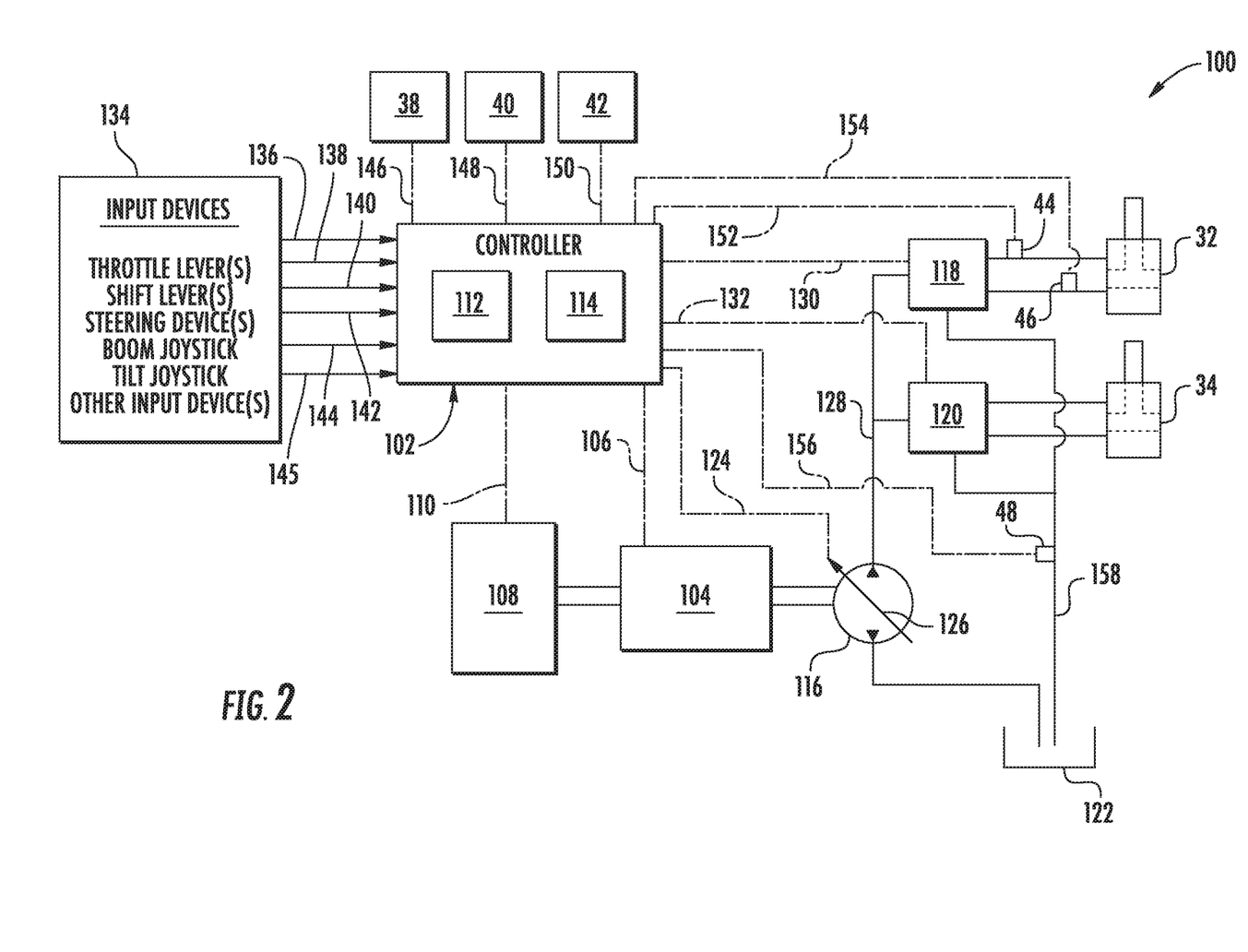
FIG. 2 illustrates a schematic view of one embodiment of a system for estimating a load weight carried by an implement of a work vehicle during automated boom movement in accordance with aspects of the present subject matter.

In addition, the lift assembly 20 may also include one or more boom cylinders 32 coupled between the chassis 16 and the boom 24 and one or more tilt cylinders 34 coupled between the chassis 16 and the implement 22 (e.g., via a pivotally mounted bellcrank 36 or other mechanical linkage). It should be readily understood by those of ordinary skill in the art that the boom and tilt cylinders 32, 34 may be utilized to allow the implement 22 to be raised/lowered and/or pivoted relative to the driving surface of the work vehicle 10. The boom cylinder(s) 32 may be extended and retracted in order to pivot the boom 24 upward and downwards, respectively, thereby at least partially controlling the vertical positioning of the implement 22 relative to the driving surface. For instance, as shown in FIG. 2, the operation of the boom cylinder(s) 32 may be controlled to move the boom 24 between a lowered position (indicated in solid lines), such as a return-to-dig-position or a return-to-travel position, and a raised position (indicated in dashed lines, such as a return-to-height position or a return-to-dump position. Additionally, the tilt cylinder(s) 34 may be extended and retracted in order to pivot the implement 22 relative to the boom 24 about the forward pivot point 30, thereby controlling the tilt angle or orientation of the implement 22 relative to the driving surface.

The work vehicle 10 may also include a plurality of sensors for monitoring for various operating parameters of the work vehicle 10. For instance, as shown in FIG. 1, the work vehicle 10 may include one or more position sensors 38, 40 for monitoring the position and/or orientation of the boom 24 and/or the implement 22, such as by including a first position sensor 38 provided in operative association with the boom 24 (e.g., at or adjacent to the aft end 28 of the boom 24) and a second position sensor 40 provided in operative association with the bellcrank 36 (e.g., at or adjacent to a pivot point for the bellcrank 36). The position sensors 38, 40 may also allow the velocity of the boom 24 and/or the implement 22 to be determined by identifying the change in position of such component(s) over time. Additionally, as shown, the work vehicle 10 may include one or more inclination sensors 42 configured to monitor the angle of inclination of the work vehicle 10, such as by including a dual-axis inclination sensor 42 mounted to the chassis 16 that is configured to monitor the angle of inclination of the work vehicle 10 in both a pitch direction (e.g., the front-to-back inclination) and a roll direction (e.g., the side-to-side inclination). Moreover, as will be described below with reference to FIG. 2, the work vehicle 10 may also include one or more pressure sensors 44, 46 (FIG. 2) for monitoring the pressure of the hydraulic fluid supplied to the boom cylinder(s) 32 and/or the tilt cylinder(s) 34 and/or one or more temperature sensors 48 (FIG. 2) for monitoring the fluid temperature of the hydraulic fluid.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration.

Referring now to FIG. 2, a schematic, simplified view of one embodiment of a system 100 for estimating a load weight carried by an implement of a work vehicle during automated boom movement is illustrated in accordance with aspects of the present subject matter. In general, the system 100 will be described herein with reference to the work vehicle 10 shown in FIG. 1. However, it should be appreciated that the disclosed system 100 may be utilized with any other suitable work vehicles to allow for implement load weights to be estimated during automated boom movement. It should be appreciated that hydraulic or fluid couplings of the system 100 shown in FIG. 2 are indicated by solid lines. Similarly, communicative links or electrical couplings of the system 100 shown in FIG. 2 are indicated by phantom lines.

As shown in FIG. 2, in several embodiments, the system 100 may include a controller 102 configured to control the operation of one or more components of the work vehicle 10, such as one or more components of the vehicle's drivetrain and/or the vehicle's lift assembly 20. For example, the controller 102 may be communicatively coupled to one or more components of an engine 104 of the work vehicle 10 (e.g., an engine governor or engine control unit (ECU) (not shown)) via one or more communicative links 106 in order to control and/or monitor the speed and/or torque output of the engine 104. Similarly, the controller 102 may be communicatively coupled to one or more components of a transmission 108 of the work vehicle 10 via one or more communicative links 110 to control the operation of the transmission 108. For instance, the controller 102 may be configured to transmit suitable control commands via communicative link 110 to one or more clutch valves (not shown) to control the engagement/disengagement of one or more clutches (not shown) of the transmission 108.

It should be appreciated the controller 102 may generally comprise any suitable processor-based device known in the art, such as one or more computing devices. Thus, in several embodiments, the controller 102 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 114 of the controller 102 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 114 may generally be configured to store suitable computer-readable instructions that, when implemented by the processor(s) 112, configure the controller 102 to perform various computer-implemented functions, such as performing the various calculations and/or algorithms described herein (including implementing the flow diagrams described below with reference to FIG. 6). In addition, the controller 102 may also include various other suitable components, such as a communications circuit or module, one or more input/output channels, a data/control bus and/or the like.

It should also be appreciated that the controller 102 may correspond to an existing controller of the work vehicle 10 (e.g., an existing engine and/or transmission controller) or the controller 102 may correspond to a separate controller. For instance, in one embodiment, the controller 102 may form all or part of a separate plug-in module that may be installed within the work vehicle 10 to allow for the disclosed system and method to be implemented without requiring additional software to be uploaded onto existing control devices of the vehicle 10.

Moreover, the controller 102 may also be communicatively coupled to one or more components for controlling the operation of the various cylinders 32, 34 of the lift assembly 20 of the work vehicle 10. For example, in several embodiments, the controller 102 may be coupled to one or more pumps 116 and associated control valves 118, 120 for controlling the flow of hydraulic fluid from a fluid tank 122 of the work vehicle 10 to each cylinder 32, 34. Specifically, as shown in FIG. 2, the lift assembly 20 may include a hydraulic pump 116 driven via an output of the engine 104. In such an embodiment, the controller 102 may be communicatively coupled to the hydraulic pump 116 (e.g., via communicative link 124) so that the position or angle of a swash plate of the first hydraulic pump 116 (the swash plate being denoted by diagonal arrow 126 through the pump 116) may be automatically adjusted to regulate the discharge pressure of the pump 116. In one embodiment, the angle of the swash plate 126 may be adjusted via an associated actuator(s) (not shown) configured to be controlled by the controller 102.

As shown in FIG. 2, the hydraulic pump 116 may be fluidly coupled to one or more boom control valves 118 and one or more tilt control valves 120 via one or more fluid lines 128. The boom control valve(s) 118 may generally be configured to regulate the supply of hydraulic fluid to the boom cylinder(s) 32, thereby controlling the extension/retraction of the boom cylinder(s) 32. Similarly, the tilt control valve(s) 120 may generally be configured to regulate the supply of hydraulic fluid to the tilt cylinder(s) 34, thereby controlling the extension/retraction of the tilt cylinder(s) 34. In several embodiments, the control valves 118, 120 may correspond to electrically controlled valves (e.g., solenoid-activated valves) to allow the controller 102 to automatically control the operation of each valve 118, 120. For instance, as shown in FIG. 2, the controller 102 may be communicatively coupled to the control valves 118, 120 via associated communicative links 130, 132, thereby allowing the controller 102 to regulate the extension/retraction of the associated cylinders 32, 34 via control of the valves 118, 120.

The controller 102 may also be communicatively coupled to one or more operator-controlled input devices 134 located within the vehicle's cab 18. As such, the controller 102 may be configured to receive various operator-initiated control commands for controlling the operation of the work vehicle 10. For instance, the controller 102 may be communicatively coupled to an engine throttle lever to allow the controller 102 to receive control signals associated with operator-initiated engine speed commands for adjusting the engine speed of the engine 104 (e.g., as indicated by arrow 136 in FIG. 2). In addition, the controller 102 may be communicatively coupled to a shift lever or other suitable input device configured to allow the operator to transmit control signals associated with operator-initiated shift commands for adjusting the current gear ratio of the transmission 108 (e.g., as indicated by arrow 138 in FIG. 2). Similarly, the controller 102 may be communicatively coupled to a steering sensor configured to allow the controller 102 to receive steering commands (e.g., as indicated by arrow 140 in FIG. 2) associated with adjustments in the vehicle's steering angle as the operator manipulates the steering wheel or other steering device of the work vehicle 10. Moreover, the controller 102 may be communicatively coupled to one or more joysticks for receiving control commands associated with controlling the movement of the boom 32 and/or the implement 34. For instance, the controller may be coupled to both a boom joystick for receiving operator-initiated control commands associated with controlling the movement of the boom 24 (e.g., as indicated by arrow 142 in FIG. 2) and a tilt joystick for receiving operator-initiated control commands associated with controlling the movement of the implement 22 (e.g., as indicated by arrow 144 in FIG. 2).

Furthermore, the controller 102 may also be communicatively coupled to one or more additional input devices, such as one or more buttons, knobs, touch pads, and/or other user interface elements, that allow the operator to provide inputs (e.g., as indicated by arrow 145 in FIG. 2) requesting that the controller 102 perform or initiate an automated boom movement operation. For instance, one or more predefined boom/implement positions may be stored within the controller's memory 114, such as a return-to-height position, a return-to-dump position, a return-to-travel position, a return-to-dig position, and/or the like. In such an embodiment, the operator may utilize an appropriate input device(s) to provide an operator input associated with the selection of one or more predefined boom/implement positions. Upon receipt of the input, the controller 102 may be configured to automatically control the operation of the control valves 118, 120 to regulate the extension and/or retraction of the associated cylinders 32, 34 of the vehicle's hydraulic system in a manner that results in the boom/implement 24, 22 being automatically moved to the operator-selected position. For instance, the controller 102 may initially control the operation of the control valve(s) 118 such that the movement velocity of the boom 24 is smoothly ramped up to a desired or predetermined speed (e.g., during an acceleration phase of the automated boom movement operation). Thereafter, the controller 102 may maintain the movement velocity of the boom 24 at or substantially at the desired or predetermined speed as the boom 24 being moved towards the operator-selected position (e.g., a constant speed phase of the automated boom movement operation). As the boom 24 nears the operator-selected position, the controller 102 may control the operation of the control valve(s) 118 such that the boom velocity is ramped down at a controller rate to zero (e.g., during a deceleration phase of the automated boom movement operation), thereby allowing the boom 24 to be smoothly stopped at the operator-selected position.

As indicated above, the controller 102 may also be communicatively coupled to one or more position sensors 38, 40 (e.g., via communicative links 146, 148) for monitoring the position(s) and/or orientation(s) of the boom 24 and/or the implement 22. In several embodiments, the position sensor(s) 38, 40 may correspond to one or more angle sensors (e.g., a rotary or shaft encoder(s) or any other suitable angle transducer(s)) configured to monitor the angle or orientation of the boom 24 and/or implement 22 relative to one or more reference points. For instance, in one embodiment, a first angle sensor(s) may be positioned at the rear pivot point for the boom 24 to allow the angular position of the boom 24 relative to the work vehicle 10 to be monitored. Similarly, in one embodiment, a second angle sensor(s) may be positioned at one of the pivot points for the bellcrank 36 to allow the position of the implement 22 relative to the boom 24 to be monitored. In alternative embodiments, the position sensors 38, 40 may correspond to any other suitable sensor(s) that is configured to provide a measurement signal associated with the position and/or orientation of the boom 24 and/or the implement 22, such as one or more inclinometers, inertial measurement units, cylinder length sensors, and/or the like. It should be appreciated that the position sensors 38, 40 may also allow the movement velocity of the boom 24 and/or the implement 22 to be determined by identifying the change in position of such component(s) over time.

Moreover, as indicated above, the controller 102 may also be communicatively coupled to one or more inclination sensors 42 (e.g., via communicative link 150) configured to monitor the angle of inclination of the work vehicle 10. For example, in several embodiments, the inclination sensor(s) 42 may comprise one or more one or more accelerometers, inclinometers, gyroscopes and/or any other suitable inclination sensor(s) configured to monitor the angle of inclination of the work vehicle 10 by measuring its orientation relative to gravity. For instance, as described above with reference to FIG. 1, the inclination sensor(s) 42 may correspond to a dual-axis sensor mounted to a portion of the chassis 16 to allow the sensor(s) 42 to monitor the angle of inclination of the work vehicle 10 in two directions (e.g., the pitch and roll directions of the work vehicle 19). However, in other embodiments, the inclination sensor(s) 42 may be disposed on the work vehicle 10 at any other suitable location.

Additionally, in several embodiments, the system 100 may also include one or more pressure sensors 44, 46 communicatively coupled to the controller 102 (e.g., via communicative links 152, 154) to allow the controller 102 to monitor the fluid pressure of the hydraulic fluid being supplied to the boom cylinder(s) 32 and/or the tilt cylinder(s) 34. For instance, as shown in FIG. 2, the controller 102 may be coupled to first and second pressure sensors 44, 46 provided in fluid communication with the fluid lines provided between the boom control valve(s) 118 and the boom cylinder(s) 32, with the first pressure sensor 44 being configured to monitor the fluid pressure of the hydraulic fluid supplied to the rod-side of the boom cylinder(s) 32 and the second pressure sensor being configured to monitor the fluid pressure of the hydraulic fluid supplied to the piston-side of the boom cylinder(s) 32. Although not shown, it should be appreciated that similar pressure sensors may also be provided in fluid communication with the fluid lines associated with the tilt cylinder(s) 34 to monitor the fluid pressure of the hydraulic fluid being supplied to such cylinder(s) 34.

Referring still to FIG. 2, the controller 102 may also be communicatively coupled to one or more temperature sensors 48 (e.g., via communicative link 156) configured to allow the temperature of the hydraulic fluid utilized within the vehicle's hydraulic system to be monitored. For instance, as shown in FIG. 2, the temperature sensor(s) 48 may, in one embodiment, be provided in operative association with a return line 158 for the hydraulic fluid to allow the fluid temperature of the hydraulic fluid being returned to the fluid tank 122 to be monitored.

It should be appreciated that the controller 102 may also be communicatively coupled to any other suitable sensors configured to monitor one or more operating parameters of the work vehicle 10 and/or its components. For instance, the controller 102 may also be communicatively coupled to a suitable sensor(s) (not shown) that allows the controller 102 to monitor the speed and/or acceleration of the work vehicle 10.

As indicated above, the disclosed system 100 may be utilized to calculate or estimate a current load weight being carried by the vehicle's implement 22. Specifically, in several embodiments, the controller 102 may include known mathematical relationships and/or look-up tables stored within its memory 114 that correlate the vehicle's boom geometry and various relevant operating parameters (e.g., the angular position of the boom 24, the angular position of the implement 22, the velocity of the boom 24 and/or the implement 22, the angle of inclination of the work vehicle 10, the boom cylinder pressure(s), the temperature of the hydraulic fluid, and the speed and/or acceleration of the work vehicle 10) to an associated load weight of the implement 22. Thus, by continuously monitoring the relevant operating parameters using the various sensors described above (e.g., the position sensors 38, 40, the inclination sensors 42, the pressure sensors 44, 46 the temperature sensors 48, and the like), the controller 102 may calculate a current load weight for the implement 22 based on such load-related data. This estimated load weight may then be displayed to the operator of the work vehicle 10 via a suitable display device housed within the cab 18.

In accordance with aspects of the present subject matter, the controller 102 may be configured to dynamically calculate the load weight for the implement 22 as the boom 24 is being moved across a range of angular boom positions during the performance of an automated boom movement operation. For instance, as indicated above, the controller 102 may be configured to automatically move the boom 24 from a starting position (e.g., the current boom position) to a final, operator-selected position as the automated boom movement operation is being performed. During such automated boom movement, the controller 102 may be configured to monitor the load-related data received from the various sensors 38, 40, 42, 44, 46, 48 to estimate the load weight associated with the implement 22.

In several embodiments, the travel range of the boom 24 may, for example, be divided into a plurality of distinct measurement regions. By receiving the load-related data from the various sensors 38, 40, 42, 44, 46, 48 as the boom 24 is automatically moved across one or more of the distinct measurement regions, the controller 102 may be configured to calculate a region load weight (e.g., an average implement load weight) for each measurement region. The controller 102 may then calculate a final load weight for the implement 22 as the total average of all or portion of the region load weights calculated for the measurement regions across which the boom 24 was moved. In doing so, as will be described in greater detail below, the controller 102 may be configured to discard or ignore any load-related data that the controller 102 determines is likely to be inaccurate or unreliable due to unstable or varying operation of the work vehicle 10, such as during an operational period(s) across which the boom velocity substantially changes (e.g., during the acceleration and/or declaration phases of the automated boom movement operation). In such instance, the controller 102 may estimate the final load weight for the implement 22 as a function of the load-related data that the controller 102 deems reliable based on analysis of the stability of the vehicle's operation.

Figure 3:
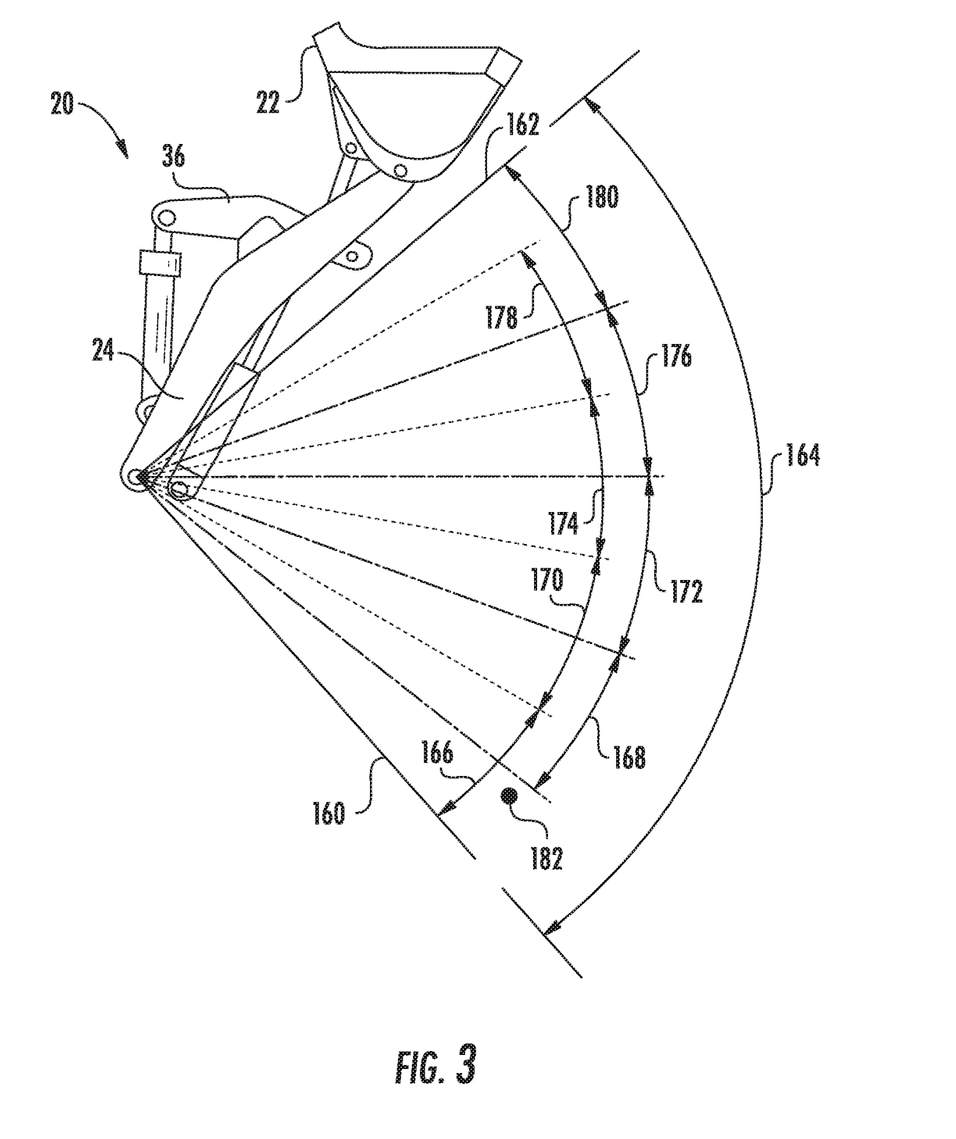
FIG. 3 illustrates a side view of a boom of the work vehicle shown in FIG. 1, particularly illustrating a travel range for the boom divided into a plurality of measurement regions in accordance with aspects of the present subject matter.

One example of the manner in which the travel range of the boom 24 may be divided into a plurality of distinct measurement regions is illustrated in FIG. 3. As shown in FIG. 3, the boom 24 may include a minimum boom position (indicated by line 160) and a maximum boom position (indicated by line 162), with the travel range 164 for the boom 24 being defined between the minimum and maximum boom positions 160, 162. Additionally, as shown in FIG. 3, the travel range 164 is divided into a plurality of distinct measurement regions. For instance, in the illustrated embodiment, the travel range 164 is divided into eight different measurement regions (e.g., a first region 166, a second region 168, a third region 170, a fourth region 172, a fifth region 174, a sixth region 176, a seventh region 178, and an eighth region 180), with adjacent regions 166, 168, 170, 172, 174, 176, 178, 180 being indicated by alternating dashed and phantom lines to distinguish the various regions within the drawing. However, in other embodiments, the travel range 164 may be divided into any other suitable number of measurement regions, including more than eight regions or less than eight regions. Each measurement region may generally span a given sub-range of angular boom positions, such as 5 degrees, 10 degrees, 15 degrees, 20 degrees, 25 degrees, and/or the like, with the specific angular range of the measurement regions generally being determined as a function of the total number of regions and the total span of the travel range 164 of the boom 24. In other embodiments, as an alternative to defining each measurement region in terms of a given angular range of boom positions, each measurement region may, for example, correspond to a given percentage of the linear stroke of the boom cylinder or a given time period of uninterrupted motion.

In several embodiments, the measurement regions 166, 168, 170, 172, 174, 176, 178, 180 may be configured to overlap one another across the travel range 164 of the boom 24. For instance, as shown in the illustrated embodiment, the measurement regions are defined such that the center of each measurement region defines a boundary line(s) for an adjacent measurement region(s). Specifically, as shown in FIG. 3, the first measurement region 166 starts at the minimum boom position 160 and extends upwardly therefrom a predetermined angular range to the center of the second measurement region 168. Similarly, the second measurement region 168 starts at the center of the first measurement region 166 and extends upwardly therefrom the predetermined angular range to the center of third measurement region 170 and so on for the remainder of the measurement regions. Thus, in an embodiment in which each measurement region extends an angular range corresponding to twenty degrees across the travel range 164 of the boom 24, the first measurement region 166 may be defined from zero degrees (i.e., defined at the minimum boom position 160) to twenty degrees, the second measurement region 168 may be defined from ten degrees to thirty degrees, the third measurement region 170 may be defined from twenty degrees to forty degrees, and so on.

It should be appreciated that, in other embodiments, the measurement regions need not be configured to overlap one another from center-to-center as shown in FIG. 3. For instance, in an alternative embodiment, each measurement region may be overlapped by two neighboring measurement regions, such as by overlapping the measurement regions at locations defined at 33% and 66% across each region's angular range. In another embodiment, each measurement region may be overlapped by three neighboring measurement regions, such as by overlapping the measurement regions at locations defined at 25%, 50%, and 75% across each region's angular range. In an even further embodiment, each measurement region may be overlapped by four or more neighboring regions. In such embodiments, by overlapping the measurement regions at smaller intervals, a greater number of measurement regions may be defined across the booms travel range 164. Alternatively, it should be appreciated that the measurement regions need not be provided in an overlapping configuration. For instance, in another embodiment, the measurement regions 166, 168, 170, 172, 174, 176, 178, 180 shown in FIG. 3 may be defined end-to-end such that boundaries are defined between adjacent regions at which one region ends and the other region begins.

As indicated above, to calculate a final load weight for the implement 22, load-related data may be collected from the various sensors 38, 40, 42, 44, 46, 48 as the boom 24 is moved across all or a portion of its travel range 164. For instance, assuming that the boom 24 is moved across its entire travel range 164, a first dataset may be collected from the sensors as the boom 24 is moved across the first measurement region 166. Similarly, a second dataset may be collected from the sensors as the boom 24 is moved across the second measurement region 168, a third dataset may be collected from the sensors as the boom 24 is moved across the third measurement region 170, and so on until the boom 24 reaches the maximum boom position 162. Each dataset may then be analyzed to calculate a region load weight (e.g., an average implement load weight) for its associated measurement region. The various region load weights calculated for the measurement regions (less any measurement regions with load-related data deemed unreliable) may then be averaged to calculate the final load weight for the implement 22.

It should be appreciated that the boom 24 need not be passed through all of the measurement regions 166, 168, 170, 172, 174, 176, 178, 180 to allow a final load weight to be calculated. For instance, when the boom 24 is only passed through a portion of the measurement regions, the region load weights calculated for those measurement regions (less any regions with data deemed unreliable) may be used as the basis for determining the final load weight.

Referring back to FIG. 2, the controller 102 may also be configured to execute a calibration procedure when the disclosed system 100 is used for the first time in association with a work vehicle 10 and/or periodically after extended use (e.g., every six months) to allow adjustments to be made, if necessary, to the predetermined relationships or look-up tables stored within the controller's memory 114 that relate the various monitored operating parameters to the implement load weight. Specifically, in several embodiments, to calibrate the system 100, the boom 24 may be raised from the minimum boom position 160 to the maximum boom position 162 at one or more speeds, such a minimum lifting speed, a maximum lifting speed, and an intermediate lifting speed, while no load is being carried by the implement 22, with the sensor data being collected as the boom 24 is moved across its travel range 164 at each speed. Such process may then be repeated while the implement 22 is carrying a known load that is at or near the maximum weight load for the implement 22, with the sensor data being collected as the boom 24 is moved across its travel range 164 at the predetermined speed(s) (e.g., the minimum lifting speed, the maximum lifting speed, and the intermediate lifting speed). By collecting such data, a relationship may be defined that correlates the load weight to the boom cylinder force (i.e., the monitored pressure values received from the pressure sensors 44, 46), the velocity of the boom 24, and the position or angle of the boom 24. The relationship may then be used, for example, as an interpolation map for calibrating the system 100 to provide dynamic load measurements.

It should be appreciated that, when performing the calibration, it may be desirable to raise the boom from its minimum boom position 160 to its maximum boom position 162 at a speed(s) associated with the boom speed(s) utilized during automated boom movement operation. For instance, when a given boom speed is used for automated boom movement, such speed may be selected as one of the calibration speeds used during the calibration procedure, such as the "intermediate lifting speed." Alternatively, the calibration procedure may be performed by only using a calibration speed(s) associated with the boom speed(s) utilized during automated boom movement operation.

As indicated above, when the controller 102 is providing dynamic load measurements, the controller 102 may be configured to discard or ignore any load-related data received during an operational period(s) across which the controller 102 determines that the data is likely to be inaccurate or unreliable due to unstable or sufficiently variable operation of the work vehicle 10. Specifically, in several embodiments, as the controller 102 is automatically controlling the operation of the vehicle's hydraulic system to move the boom 24 from its current position to an operator-selected position (e.g., a return-to-height position or a return-to-travel position), the controller 102 may be configured to identify the portions of such automated boom movement associated with the acceleration/deceleration phases of the automated boom movement operation. In such instances, the controller 102 may be configured to discard or ignore load-related data captured during such operational period(s) when estimating the implement load weight or simply define the load measurement range as extending across a sub-range of boom positions that excludes the boom positions associated with such operational period(s). As a result, the load weight may be calculated based on data collected only when it is determined that the vehicle's operation is relatively stable.

Figure 4:
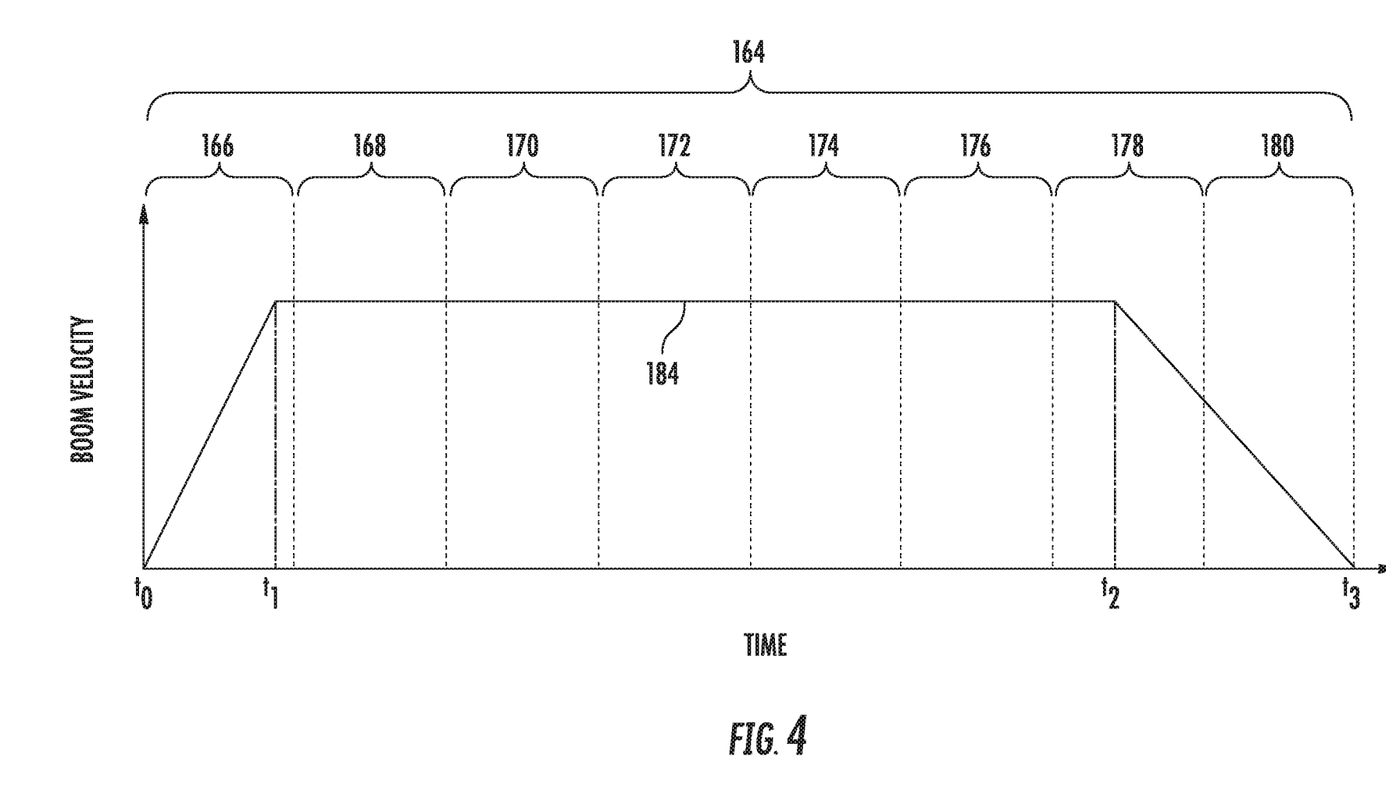
FIG. 4 illustrates an example velocity profile plot that graphs boom velocity as function of time as a boom is being moved across its travel range, particularly illustrating the boom velocity profile relative to a plurality of measurement regions defined across the boom's travel range.

For instance, FIG. 4 illustrates a graphical representation of one example of how the boom velocity profile may vary over time as the boom 24 is automatically moved from its current position to an operator-selected position, such as across its travel range 164 from the minimum boom position 160 to the maximum boom position 162. As shown in FIG. 4, the boom's travel range 164 has been divided into the various measurement regions 166, 168, 170, 172, 174, 176, 178, 180 described above with reference to FIG. 3, with each measurement region corresponding to a discrete operational period along which the load-related sensor data is being collected by the controller 102 as the boom 24 is moved along the angular range associated with each region.

As shown, upon initiation of the automated boom movement operation (e.g., at time to), the boom velocity (indicated by line 184) is initially ramped up at a controlled rate until the boom velocity is equal to a desired boom speed (e.g., at time $t_1$). As indicated above, this initial phase of the automated boom movement operation may be referred as the acceleration phase during which the boom velocity is being increased to the desired boom speed for moving for the boom to the operator-selected position. Additionally, as shown in FIG. 4, once the desired boom speed is achieved (e.g., at time $t_1$), the controller 102 may be configured to control the operation of the vehicle's hydraulic system to maintain the boom velocity substantially constant at the desired boom speed. Such substantially constant boom velocity is maintained until the boom 24 reaches a position nearby (e.g., within a certain distance of) the operator-selected position, at which the boom velocity will need to be reduced to allow the boom movement to be smoothly stopped at the operator selected position. For instance, in the illustrated embodiment, the boom 24 is shown as reaching such nearby position at time $t_2$, at which point the controller 102 controls the operation of the vehicle's hydraulic system to steadily ramp-down the boom velocity at a controlled rate until the boom 24 reaches the operator-selected position (e.g., at time $t_3$). As indicated above, this final phase of the automated boom movement may be referred to as the deceleration phase during which the boom velocity is being decreased down to zero as the boom 24 reaches the operator-selected position.

Given such a velocity profile, the controller 102 may, in several embodiments, be configured to discard or ignore the load-related data received within the measurement region(s) associated with the acceleration and deceleration phases of the automated boom movement operation. For instance, in the illustrated embodiment, the acceleration phase spans over a portion of the first measurement region 166, while the deceleration phase spans across portions of both the seventh measurement region 178 and the eighth measurement region 180. Thus, the controller 102 may be configured to disregard or ignore the load-related data received within such measurement regions 166, 178, 180. In such an embodiment, to determine the final load weight for the implement 22, the controller 102 may be configured to calculate the region load weight for the remaining measurement regions associated with the constant speed phase of the automated boom movement operation during which the boom velocity is maintained constant or substantially constant. For instance, the controller 102 may determine an average load weight for the second, third, fourth, fifth, and sixth measurement regions 168, 170, 172, 174, 176 based on the load-related data received within such measurement regions. The controller 102 may then calculate the final load weight by averaging the region load weights determined for the analyzed measurement regions 168, 170, 172, 174, 176.

It should be appreciated that, as an alternative to using pre-defined measurement regions, the controller 102 may be configured to dynamically determine or define the measurement regions to be used for collecting load-related data based on the specific range of movement associated with the automated boom movement operation being performed. For instance, as indicated above, the controller 102 may be configured to track the boom position using the data received from the associated position sensor(s) 38, 40, thereby allowing the controller 102 to determine the current or starting boom position at the initiation of the automated boom movement operation (e.g., upon receipt of the operator input instructing the controller 102 to automatically move the boom 24 to an operator-selected position). By knowing the starting boom position and the final operator-selected position, the controller 102 may identify the angular range of boom positions across which the boom 24 will be moved. Thereafter, by knowing or estimating the acceleration/declaration rates used during the acceleration and deceleration phases of the automated boom movement operation, as well as the desired boom speed used for the constant speed phase of the automated boom movement operation, the controller 102 may identify the specific sub-range of boom positions associated with the constant speed phase. Such sub-range of boom positions may be identified as the desired load measurement range. The desired load measurement range may then be defined as a single load measurement region spanning the sub-range of boom positions or sub-divided into a plurality of discrete load measurement regions (e.g., a plurality of overlapping or non-overlapping measurement regions defined across the sub-range of boom positions).

As an alternative to calculating or estimating the specific sub-range of boom positions associated with the constant speed phase, the controller 102 may be configured to identify the occurrence of the constant speed phase of the automated boom movement operation by monitoring the boom velocity (e.g., via the data provided by the position sensor(s) 38, 40). Specifically, the controller 102 may be configured to monitor the boom velocity as the automated boom movement operation is being performed to identify the boom position at which the operation transitions between the acceleration phase and the constant speed phase (e.g., by determining the boom position at which the rate of change of the boom velocity drops below a given threshold or at which the boom velocity reaches a threshold speed, such as the desired boom speed for moving the boom to the operator selected position). Once such transition is detected, the controller 102 may then start monitoring the load-related data received from the sensors (or stop ignoring or discarding the data). Thereafter, the controller 102 may monitor the boom velocity to detect the boom position at which the operation transitions between the constant speed phase and the declaration phase (e.g., by determining the boom position at which the rate of change of the boom velocity increases above a given threshold or at which the boom velocity drops below a threshold speed), at which point the controller 102 may stop monitoring the load-related data received from the sensors (or start ignoring or discarding the data) as the boom velocity is reduced to allow the boom 23 to be stooped at the final, operator-selected position.

As yet another embodiment, the controller 102 may be configured to identify the occurrence of the constant speed phase of the automated boom movement operation based simply on the boom movement commands being transmitted by the controller 102 to the associated control valve(s) 118. Specifically, the controller 102 may identify when the boom movement commands transition from increasing commands to steady-state or substantially constant commands (thereby indicating a transition from the acceleration phase to the constant speed phase) and then transition from the steady-state or substantially constant commands to decreasing commands (thereby indicating a transition from the constant speed phase to the deceleration phase).

Figure 5:
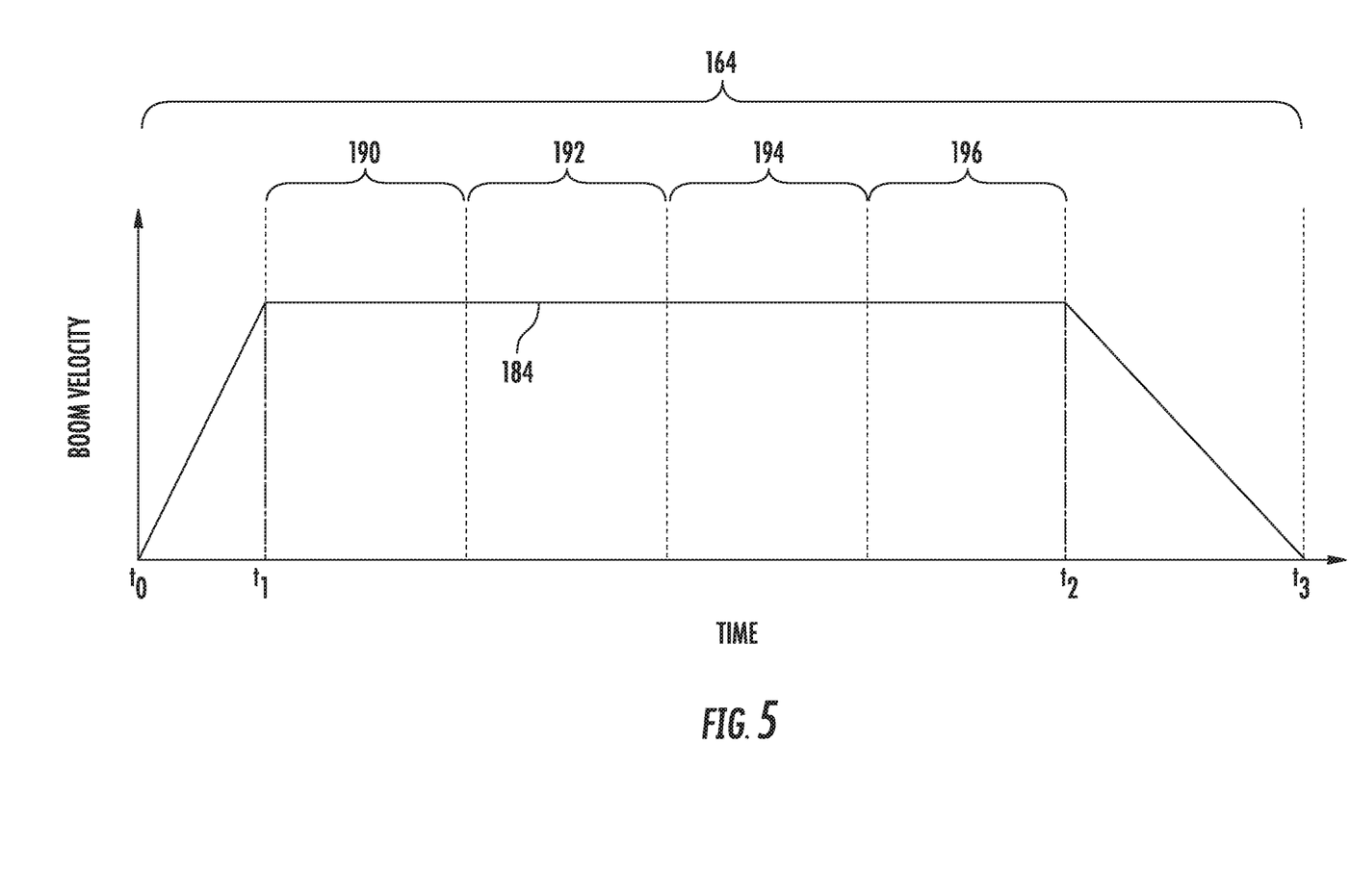
FIG. 5 illustrates the same exemplary velocity profile plot of FIG. 4, particularly illustrating the boom velocity profile relative to a plurality of measurement regions associated with a constant speed phase of an automated boom movement operation.

Referring now to FIG. 5, a graphical representation of the same boom velocity profile described above with reference to FIG. 4 is illustrated in accordance with aspects of the present subject matter. However, as shown in FIG. 5, as an alternative to using pre-defined or predetermined measurement regions that span across the entire travel range 164 of the boom 24, the controller 102 has dynamically defined a plurality of measurement regions spanning across the constant speed phase of the automated boom movement operation. Specifically, the angular range of boom positions across which the boom is to be moved within constant speed phase (e.g., from time $t_1$ to time $t_2$) has been sub-divided into a plurality of load measurement regions (e.g., a first measurement region 190, a second measurement region 192, a third measurement region 194, and a fourth measurement region 196). In such instance, as the boom 24 is moved from its starting position to the final operator-selected position, the controller 102 may collect load-related data within the various measurement regions 190, 192, 194, 196 associated with the constant speed phase of the automated boom movement operation and subsequently determine an average load weight for each measurement region based on the load-related data. The controller 102 may then calculate the final load weight by averaging the region load weights determined for the analyzed measurement regions 190, 192, 194, 196.

It should be appreciated that, in addition to filtering out or not collecting load-related data associated with the acceleration and deceleration phases of the automated boom movement operation, the controller 102 may also be configured to discard or ignore data collected within constant speed phase of the automated boom movement operation that may be deemed unreliable or inaccurate due to other factors that result in variable operation, such as when operator-initiated commands are received during the constant speed phase that may impact the reliability of the load-data being collected (e.g., operator-initiated boom movement commands, steering commands, transmission shift commands and/or engine speed commands. For instance, when an operator-initiated command is received during the constant speed phase, the controller 102 may be configured to compare a rate of change of the operator-initiated command to a predetermined variance threshold defined for such operator-initiated command to identify instances in which the variance or rate of change of the command exceeds the threshold. In the event that the rate of change exceeds the predetermined variance threshold, the controller 102 may, for example, be configured to discard or ignore the load-related data collection in the load measurement region(s) within which such threshold was exceeded.

Moreover, in addition to filtering out or ignoring load-related data associated with variability in the operator-initiated control commands received by the controller 102, significant variations in the load weight calculated by the controller 102 may also be identified and utilized as a means to disregard or ignore specific sets of load-related data and/or specific load weight calculations. Specifically, when a significant change in the implement load weight calculated by the controller 102 is detected (e.g., a change above a given a load variance threshold), such a detected load variation may suggest that an additional load has been added to (or removed from) the implement 22 after the load weight calculations were initiated or that there was an additional resistance to lifting the boom 22 at the initiation of the load weight calculations which was subsequently overcome (e.g., when the implement 22 was initially in a gravel pile as the boom 22 began to be lifted and then subsequently cleared the pile). In such instance, the controller 102 may be configured to disregard any load weight calculations made before the detected load variation to ensure that the final load weight determined for the implement 22 is reliable. For instance, as an example, when a significant load variation is detected between successive measurement regions, the controller 102 may flag the previous measurement regions as inaccurate and may only consider the load weight calculations provided for the subsequent measurement regions when determining the final load weight for the implement 22.

Figure 6:
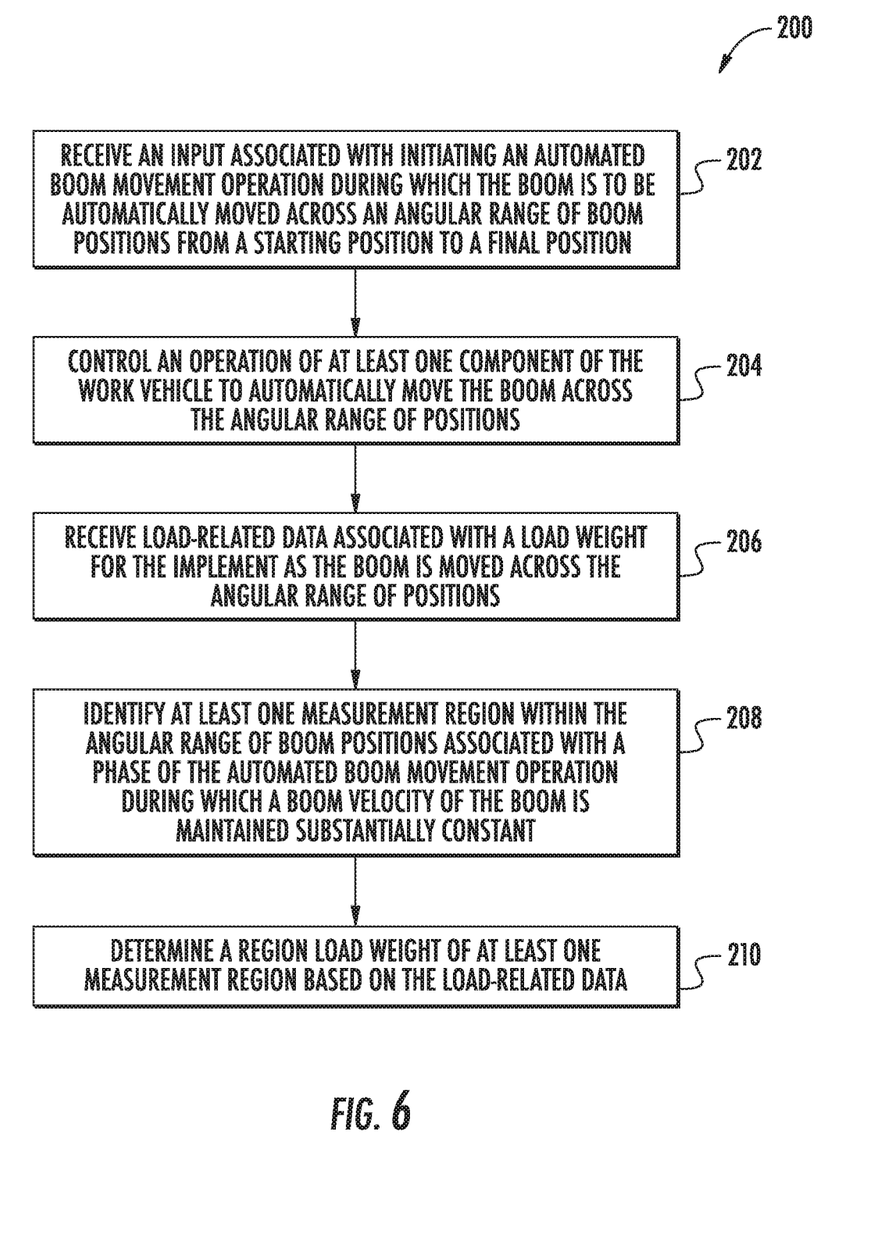
FIG. 6 illustrates a flow diagram of one embodiment of a method for estimating a load weight carried by an implement of a work vehicle during automated boom movement in accordance with aspects of the present subject matter.

Referring now to FIG. 6, a flow diagram of one embodiment of a method 200 for estimating load weights for an implement of a work vehicle during automated boom movement is illustrated in accordance with aspects of the present subject matter. In general, the method 200 will be described herein with reference to the work vehicle 10 shown in FIG. 1, as well as the various system components shown in FIG. 2. However, it should be appreciated that the disclosed method 200 may be implemented with work vehicles having any other suitable configuration and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 includes receiving an input associated with initiating an automated boom movement operation during which a boom of the work vehicle is to be automatically moved across an angular range of boom positions from a starting position to a final position. For instance, as indicated above, the controller 102 may be configured to receive an input from the operator associated with initiating an automated boom movement operation, such as when the operator provides an input instructing the controller 102 to automatically move the boom 24 to a predefined position.

Additionally, at (204), the method 200 includes controlling an operation of at least one component of the work vehicle to automatically move the boom across the angular range of positions. For instance, as indicated above, the controller 102 may be configured to raise and lower the boom 24 across all or a portion of its travel range 164 by controlling the operation of the associated components of the lift assembly 20, such as by the hydraulic pump(s) 116, the boom control valve(s) 118, and the boom cylinder(s) 32.

Moreover, at (206), the method 200 includes receiving load-related data associated with a load weight for the implement as the boom is moved across the angular range of positions. For instance, as indicated above, the controller 102 may be configured to receive load-related data associated with the implement load weight from a plurality of sensors, such as one or more pressure sensors 44, 46, position sensors 38, 40, inclination sensors 42, temperature sensors 48, and/or the like. Such data may, for example, include, but is not limited to, pressure measurements related to the fluid pressure of the hydraulic fluid supplied to the boom cylinder(s) 32, position measurements related to the angular position of the boom 24 and/or the implement 22, velocity data for the boom 24 and/or the implement 22, orientation measurements associated with the inclination angle of the work vehicle 10 (e.g., in the pitch direction and/or the roll direction), temperature measurements of the fluid temperature of the hydraulic fluid supplied to the cylinder(s) 32, 34, and/or measurements related to the speed and/or acceleration of the work vehicle 10.

Referring still to FIG. 6, at (208), the method 200 includes identifying at least one measurement region within the angular range of boom positions associated with a phase of the automated boom movement operation during which a boom velocity of the boom is maintained substantially constant. Specifically, as indicated above, the controller 102 may be configured to identify one or more measurement regions associated with the constant speed phase of the automated boom movement operation. For instance, when pre-defined or predetermined measurement regions are utilized, the controller 102 may identify which of the pre-defined regions are associated with the constant speed phase of the automated boom movement operation being performed. Alternatively, as described above, the controller 102 may be configured to dynamically define the applicable measurement regions relative to the constant speed phase of the automated boom movement operation, such as by estimating the range of angular boom positions associated with the constant speed phase based on known positions, acceleration/declaration rates, and/or boom speeds, or by identifying the occurrence of the constant speed phase based on, for example, the monitored position and/or velocity of the boom and/or the boom movement commands being transmitted to the associated control valve(s) 118.

Additionally, at (210), the method 200 includes determining a region load weight the at least one measurement region based on the load-related data. Specifically, as indicated above, the controller 102 may, in one embodiment, be configured to calculate a region load weight for each of the measurement regions across which the boom 24 is moved during the constant speed phase of the automated boom movement operation (less any measurement regions with load-related data deemed unreliable) based on the load-related data received for each measurement region. For instance, the controller 102 may store a dataset of load-related data for each measurement region across which the boom 24 is moved during such phase of the operation. Assuming that the load-related data for a given dataset is deemed reliable (e.g., based on the stability of the operator-initiated commands across such measurement region and/or based on the stability of the calculated load weights), the controller 102 may then calculate an average implement load weight for the associated measurement region based on its corresponding dataset.

As noted above, after determining the region load weight(s) for the applicable measurement region(s), the controller 102 may then be configured to calculate a final load weight for the implement. For example, as indicated above, the controller 102 may be configured to determine the final load weight for the implement 22 by averaging the various region load weights calculated for the various measurement regions.

It is to be understood that the steps of the method 200 are performed by the controller 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 102 described herein, such as the method 200, is implemented in software code or instructions which are tangibly stored on a tangible computer readable medium. The controller 102 loads the software code or instructions via a direct interface with the computer readable medium or via a wired and/or wireless network. Upon loading and executing such software code or instructions by the controller 102, the controller 102 may perform any of the functionality of the controller 102 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for estimating load weights for an implement of a work vehicle during automated boom movement, the method comprising:

controlling, with the one or more computing devices, an operation of at least one component of the work vehicle to perform an automated boom movement operation during which a boom of the work vehicle is automatically moved across an angular range of boom positions from a starting position to a final position;

receiving, with the one or more computing devices, load-related data associated with a load weight for the implement as the boom is moved across the angular range of boom positions;

identifying, with the one or more computing devices, at least one measurement region within the angular range of boom positions associated with a phase of the automated boom movement operation during which a boom velocity of the boom is maintained substantially constant; and determining, with the one or more computing devices, a region load weight the at least one measurement region based on the load-related data;

wherein the automated boom movement operation comprises an acceleration phase during which the boom velocity is increased, a constant speed phase during which the boom velocity is maintained substantially constant, and a declaration phase during which the boom velocity is decreased; and wherein identifying the at least one measurement region within the angular range of boom positions comprises:
identifying a sub-range of the angular range of boom positions across which the boom is to be moved during the constant speed phase of the automated boom movement operation; and
defining the at least one measurement region across at least a portion of the sub-range of the angular range of boom positions.

2. The method of claim 1, wherein a plurality of measurement regions are defined across the angular range of boom positions, the plurality of measurement regions comprising at least one first measurement region associated with the acceleration phase of the automated boom movement region, at least one second measurement region associated with the constant speed phase of the automated boom movement, and at least one third measurement region associated with the deceleration phase of the automated boom movement region.

3. The method of claim 2, wherein identifying the at least one measurement region comprises identifying the at least one second measurement region as being associated with the phase of the automated boom movement operation during which the boom velocity is maintained substantially constant, and wherein determining the region load weight for the at least one measurement region comprises determining a region load weight for the at least one second measurement region based on the load-related data received as the boom is moved across the at least one second measurement region.

4. The method of claim 3, further comprising disregarding the load-related data received as the boom is moved across the at least one first measurement region and the at least one third measurement region.

5. The method of claim 1, wherein identifying the at least one measurement region within the angular range of boom positions comprises:
monitoring the boom velocity to identify a first boom position at which the automated boom movement operation transitions from the acceleration phase to the constant speed phase and a second boom position at which the automated boom movement operation transitions from the constant speed phase to the declaration phase; and
defining the at least one measurement region across a sub-range of the angular range of boom positions extending at least partially between the first and second boom positions.

6. The method of claim 1, further comprising calculating a final load weight for the implement based on the region load weight for the at least one measurement region.

7. The method of claim 6, wherein calculating the final load weight for the implement comprises averaging the region load weight determined for the at least one measurement region to calculate the final load weight.

8. The method of claim 1, wherein receiving the load-related data comprises receiving sensor data associated with at least one of a pressure of hydraulic fluid supplied to or within a boom cylinder of the work vehicle, a position of the boom, a position of the implement, the boom velocity, a velocity of the implement, a temperature of the hydraulic fluid, an inclination angle of the work vehicle, or at least one of speed or acceleration of the work vehicle.

9. The method of claim 1, further comprising receiving an input associated with a request by an operation of the work vehicle to automatically move the boom to the final position.

10. A system for estimating implement load weights for a work vehicle during automated boom movement, the system comprising:
a lift assembly including a boom and an implement coupled to the boom;
a controller configured to control the operation of the lift assembly, the controller including a processor and associated memory, the memory storing instructions, that when implemented by the processor, configure the controller to:
receive an input associated with initiating an automated boom movement operation during which the boom is to be automatically moved across an angular range of boom positions from a starting position to a final position;
control an operation of at least one component of the work vehicle to automatically move the boom across the angular range of boom positions;
receive load-related data associated with a load weight for the implement as the boom is moved across the angular range of boom positions;
identify at least one measurement region within the angular range of boom positions associated with a phase of the automated boom movement operation during which a boom velocity of the boom is maintained substantially constant; and
determine a region load weight the at least one measurement region based on the load-related data; and
wherein the automated boom movement operation comprises an acceleration phase during which the boom velocity is increased, a constant speed phase during which the boom velocity is maintained substantially constant, and a declaration phase during which the boom velocity is decreased; and
wherein the controller is configured to identify the at least one measurement region within the angular range of boom positions by identifying a sub-range of the angular range of boom positions across which the boom is to be moved during the constant speed phase of the automated boom movement operation and defining the at least one measurement region across at least a portion of the sub-range of the angular range of boom positions.

11. The system of claim 2, wherein a plurality of measurement regions are defined across the angular range of boom positions, the plurality of measurement regions comprising at least one first measurement region associated with the acceleration phase of the automated boom movement region, at least one second measurement region associated with the constant speed phase of the automated boom movement, and at least one third measurement region associated with the deceleration phase of the automated boom movement region.

12. The system of claim 11, wherein the controller is configured to determine the region load weight for the at least one measurement region by determining a region load weight for the at least one second measurement region based on the load-related data received as the boom is moved across the at least one second measurement region.

13. The system of claim 12, wherein the controller is further configured to disregard the load-related data received as the boom is moved across the at least one first measurement region and the at least one third measurement region.

14. The system of claim 10, wherein the controller is configured to identify the at least one measurement region within the angular range of boom positions by monitoring the boom velocity to identify a first boom position at which the automated boom movement operation transitions from the acceleration phase to the constant speed phase and a second boom position at which the automated boom movement operation transitions from the constant speed phase to the declaration phase, and defining the at least one measurement region across a sub-range of the angular range of boom positions extending at least partially between the first and second boom positions.

15. The system of claim 10, wherein the controller is further configured to calculate a final load weight for the implement based on the region load weight for the at least one measurement region.

16. The system of claim 15, wherein the controller is configured to calculate the final load weight by averaging the region load weight determined for the at least one measurement region.

* * * * *